(12) United States Patent
Taillard (10) Patent No.: US 11,465,592 B2
(45) Date of Patent: Oct. 11, 2022

(54) WINDSCREEN WIPER DEVICE OF THE FLAT BLADE TYPE

(71) Applicant: TRICO BELGIUM SA, Aubange (BE)

(72) Inventor: Arthur Taillard, Herserange (FR)

(73) Assignee: Trico Belgium SA, Aubange (BE)

( * ) Notice: Subject to any disclaimer, the term of this patent is extended or adjusted under 35 U.S.C. 154(b) by 0 days.

(21) Appl. No.: 17/262,808

(22) PCT Filed: Jul. 23, 2018

(86) PCT No.: PCT/EP2018/069931
§ 371 (c)(1),
(2) Date: Jan. 25, 2021

(87) PCT Pub. No.: WO2020/020431
PCT Pub. Date: Jan. 30, 2020

(65) Prior Publication Data
US 2021/0309184 A1 Oct. 7, 2021

(51) Int. Cl.
*B60S 1/38* (2006.01)
*B60S 1/40* (2006.01)

(52) U.S. Cl.
CPC .......... *B60S 1/3856* (2013.01); *B60S 1/4087* (2013.01)

(58) Field of Classification Search
CPC .... B60S 1/3856; B60S 1/4087; B60S 1/3858; B60S 2001/3815
See application file for complete search history.

(56) References Cited

U.S. PATENT DOCUMENTS

| 3,405,419 | A | * | 10/1968 | Arthurt | B60S 1/42 |
| | | | | | 15/250.32 |
| 6,820,304 | B1 | * | 11/2004 | Gossez | B60S 1/3801 |
| | | | | | 15/250.44 |
| 2008/0313844 | A1 | * | 12/2008 | Nacamuli | B60S 1/3801 |
| | | | | | 15/250.351 |
| 2010/0083454 | A1 | * | 4/2010 | Op't Roodt | B60S 1/3801 |
| | | | | | 15/250.32 |
| 2015/0375716 | A1 | * | 12/2015 | An | B60S 1/3801 |
| | | | | | 15/250.32 |

FOREIGN PATENT DOCUMENTS

| WO | 2016119852 | 8/2016 |
| WO | 2017190762 | 11/2017 |

\* cited by examiner

*Primary Examiner* — Andrew A Horton
(74) *Attorney, Agent, or Firm* — Bryan Cave Leighton Paisner LLP (57) ABSTRACT

A windscreen wiper device of the flat blade type is provided. The windscreen wiper device includes a connecting device for a rod-like extension of an oscillating arm. The rod-like extension can be pivotally connected to the connecting device about a pivot axis near one end thereof. The connecting device comprises a channel arranged to receive the rod-like extension. The channel includes a first chamber facing towards an entrance of the channel, as well as a second chamber facing away from the entrance. The first chamber has a larger width than the second chamber. The first chamber is arranged to receive a first part of the free end of the rod-like extension. The second chamber is arranged to receive a second part of the free end of the rod-like extension. The first part of the rod-like extension has a larger width than the second part of the rod-like extension.

20 Claims, 6 Drawing Sheets

WINDSCREEN WIPER DEVICE OF THE FLAT BLADE TYPE

BACKGROUND OF THE INVENTION

A windscreen wiper device is generally known. This prior art windscreen wiper device is designed as a so-called "flat blade" or "yokeless blade", wherein no use is made of several yokes pivotally connected to each other, but wherein the wiper blade is biased by the carrier element, as a result of which it exhibits a specific curvature.

The object of the invention is to provide an improved windscreen wiper device.

SUMMARY OF THE INVENTION

In order to accomplish that objective, a windscreen wiper device of the type is characterized according to the invention in that the connecting device comprises a channel arranged to receive the rod-like extension, the channel including a first chamber facing towards an entrance of the channel, as well as a second chamber facing away from the entrance, the first chamber having a larger width than the second chamber. The first chamber is arranged to receive a first part of the free end of the rod-like extension, and wherein the second chamber is arranged to receive a second part of the free end of the rod-like extension, the first part of the rod-like extension having a larger width than the second part of the rod-like extension. In other words, the free end of the rod-like extension has a cut-out in order to form the two parts therein, wherein the first part is wider than the second part. The second part forms a longitudinally extending finger to be accommodated in the correspondingly shaped second chamber of the channel. The wider first part is to be accommodated in the correspondingly shaped first chamber of the channel. Due to the cut-out there is a larger guiding surface in the connecting device to guide the rod-like extension inside the channel in a reliable yet controlled manner. Preferably, the first and second chambers of the channel have a closed circumference to enhance retention of the rod-like extension therein.

The present invention relates to a windscreen wiper device of the flat blade type comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for a rod-like extension of an oscillating arm, wherein a rod-like extension can be pivotally connected to the connecting device about a pivot axis near one end thereof. The longitudinal strip is also called a "flexor", while the connecting device is also indicated as a "connector".

Preferably, the wiper blade comprises a spoiler at a side thereof facing away from the windscreen to be wiped. The spoiler is also called an "air deflector" and is preferably made in one piece with the wiper blade through extrusion. The longitudinal groove is preferably a central longitudinal groove accommodating the longitudinal strip. The connecting device is preferably fixedly connected to the longitudinal strip(s) particularly through a welding, brazing ("soldering"), gluing or clamping operation or with the help of a pin inserted through the connecting device and the longitudinal strip(s). In the alternative or in addition thereto, the connecting device is clamped onto the flexible material of the wiper blade, particularly in case the latter is equipped with a central longitudinal groove for the carrier element.

In use, the oscillating arm is connected to a mounting head mounted on a drive shaft. The oscillating arm at one end thereof is pivotally connected to the mounting head by means of a pivot pin and at another end thereof is connected to the wiper blade placed in abutment with the windscreen to be wiped. In use, the shaft rotates alternately in a clockwise and in a counter-clockwise sense carrying the mounting head into rotation also, which in turn draws the oscillating arm into rotation and by means of the connecting device moves the wiper blade. the oscillating arm can thus oscillate to-and-from between a first and second reversal positions.

The present invention also relates to a connecting device, as well as an oscillating arm with a rod-like extension arranged for use in such a windscreen wiper device.

It is noted that the present invention is not restricted to automobiles, but also refers to rail coaches and other (fast) vehicles.

In a preferred embodiment of a windscreen wiper device in accordance with the invention, the channel is arranged to receive two types of the rod-like extension. The types mutually differing in width of the first and second parts thereof, respectively. In other words, the first part of the first type rod-like extension is wider than the first part of the second type rod-like extension, while the second part of the first type rod-like extension is wider than the second part of the second type rod-like extension. The channel is arranged to accommodate both types of rod-like extension. In the alternative, if the connecting device comprises a first part and a second part as claimed in claim 9, the second part acting acts a joint part and differs for each type of rod-like extension. Hence, the first part is a universal part, whereas there are two types of second part corresponding to the two types of rod-like extensions.

In a further preferred embodiment of a windscreen wiper device according to the invention, the connecting device comprises a sidewardly and inwardly extending protrusion arranged to engage into a first recess provided on a longitudinal exterior side of the rod-like extension.

The connecting device comprises a resilient tongue arranged to engage into a second recess provided on the longitudinal exterior side of the rod-like extension. The resilient tongue is hingeable along a hinge axis between an inward position retaining the wiper blade onto the rod-like extension and an outward position releasing the wiper blade from the rod-like extension. Particularly, the channel has a closed circumference. More in particular, the channel is formed by a blind hole having a closed circumference. The resilient tongue cooperating with the second recess on the one hand and the protrusion cooperating with the first recess on the other hand form first and second retention means, respectively, for retaining the wiper blade onto the oscillating arm. The first and second retention means can be used independently from one another, i.e. the first retention means can be used without the second retention means and the second retention means can be used without the first retention means.

Preferably, the channel has a length and a width. A plane extending in a direction of the width of the channel and a plane extending through the longitudinal strip along a width thereof at the location of the connecting device enclose an angle $\alpha$, wherein preferably $150 < \alpha < 600$. In other words, in a transverse or cross-section of the windscreen wiper device, a center line of the cross-sectional plane of the channel encloses the angle $\alpha$ with a symmetry axis of the longitudinal groove. Because of the angle α less pressure by the oscillating arm on the wiper blade is necessary to maintain high velocity wiping performances.

In the framework of the present invention the oscillating arm is equipped with the rod-like extension preferably having a rectangular cross-section. The extension is to be inserted in the channel of the connecting device. The extension has a twisted orientation relative to the oscillating arm preferably having a U-shaped cross-section. Such a twisted arm extension has proven to considerably improve an air flow, to considerably reduce a height of the windscreen wiper device, whereas its design is attractive from a commercial perspective. The channel preferably having a rectangular cross-section as well, has a twisted orientation corresponding to the twisted orientation of the arm extension in order to accommodate the arm extension during use. In other words, a bottom of the channel does not extend parallel to a windscreen to be wiped (when the oscillating arm in one of the reversal positions is in a central region of the windscreen to be wiped and disregarding any small curvature thereof in that region), but the bottom and the windscreen to be wiped enclose the angle α in that region. It is noted that the present invention is not restricted to the use of only one longitudinal strip forming the elastic carrier element that is particularly located in a central longitudinal groove of the wiper blade. Instead, the carrier element may also comprise two longitudinal strips, wherein the strips are disposed in opposite longitudinal grooves of the wiper blade. These groove(s) may be closed at one outer end.

In a further preferred embodiment of a windscreen wiper device in accordance with the invention, the protrusion is dimensioned such that in a working position of the wiper blade pivoted relative to the rod-like extension, the protrusion engages into the first recess thus retaining the wiper blade onto the rod-like extension; in a service position of the wiper blade pivoted relative to the rod-like extension, the protrusion disengages from the first recess thus releasing the wiper blade from the rod-like extension.

In a further preferred embodiment of a windscreen wiper device according to the invention, the first and second recesses have an open circumference and are spaced-apart in longitudinal direction.

In a further preferred embodiment of a windscreen wiper device in accordance with the invention, the resilient tongue is hingeable from the inward position into the outward position by a push button. The push button forms a part of an outer wall of the connecting device.

Particularly, the push button is located near a free end of the connecting device facing towards the rod-like extension.

In a further preferred embodiment of a windscreen wiper device according to the invention, the connecting device comprises a first part and a second part. The rod-like extension of the oscillating arm can be pivotally connected to the first part about the pivot axis, with the interposition of the second part. The second part comprises the channel. The first part is connected to the wiper blade and the second part is detachably connected to the first part.

Preferably, the first and the second parts are each made in one piece of plastic material. In a further preferred embodiment of a windscreen wiper device in accordance with the invention, the first part and the second part are provided with mutually cooperating pivot means for pivotally connecting the second part to the first part. Particularly, the second part is connected to the first part by pivotally engaging protuberances of the first part, at the location of the pivot axis, in recesses provided in the second part. More in particular, the second part is detachably connected to the first part through a snapping/clipping operation.

In a further preferred embodiment of a windscreen wiper device according to the invention, the first part comprises a flat base having legs integral therewith engaging around longitudinal sides of the wiper blade, at the location of the groove. Preferably, the first part comprises two opposite side walls extending in upright direction from the base. One of the side walls comprises the sidewardly and inwardly extending protrusion. More preferably, the pivotally engaging protuberances of the first part are provided outwardly on the opposite side walls. The recesses are provided inwardly in opposite walls of the second part. The protuberances are particularly mutually spaced far apart, so as to reduce angular play and to reduce wear.

In a further preferred embodiment of a windscreen wiper device in accordance with the invention, the side walls of the first part are entirely located inside the second part in a working position of the wiper blade.

BRIEF DESCRIPTION OF THE DRAWINGS

The invention will now be explained in more detail with reference to figures illustrated in a drawing, wherein.

DETAILED DESCRIPTION OF PREFERRED EMBODIMENTS

Figure 1A:
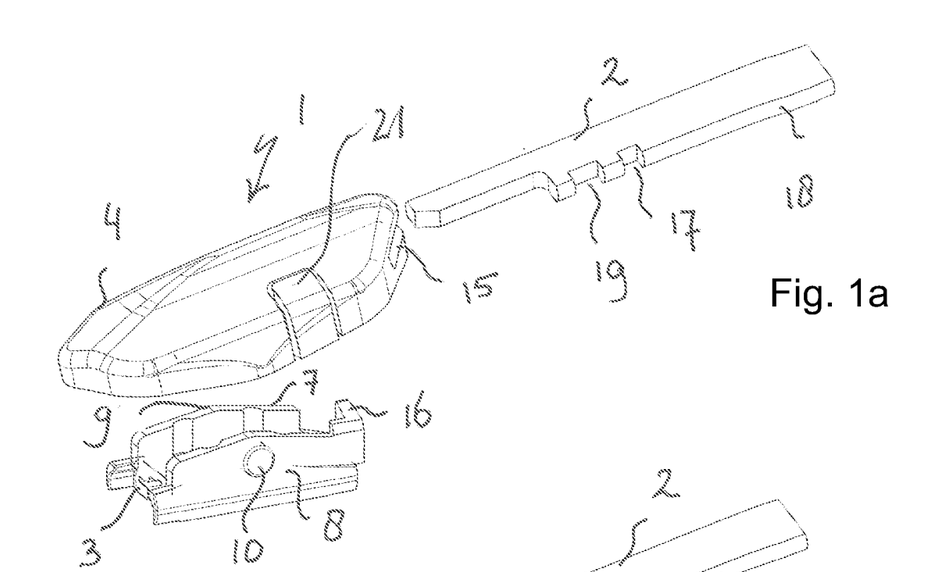
FIGS. 1a, 1b, and 1c show in perspective details of a windscreen wiper device of the flat blade type according to an embodiment of the invention, wherein successive steps are shown for fitting an windscreen wiper arm to a connecting device of a wiper blade.
Figure 1B:
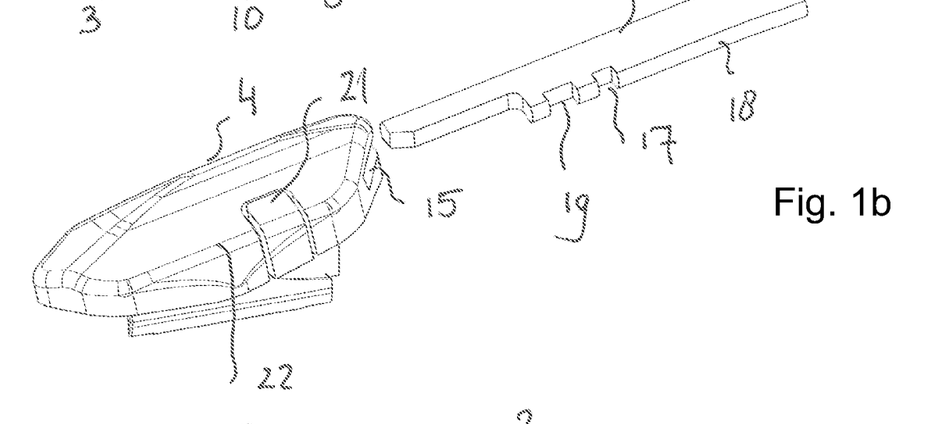
Figure 1C:
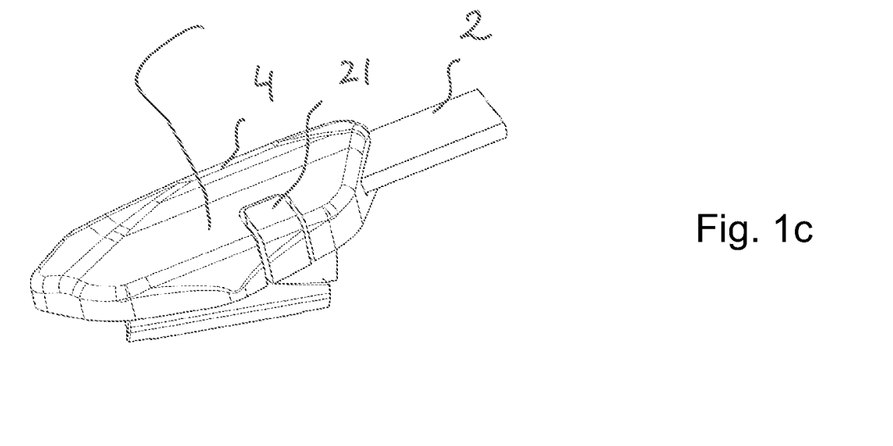
Figure 2A:
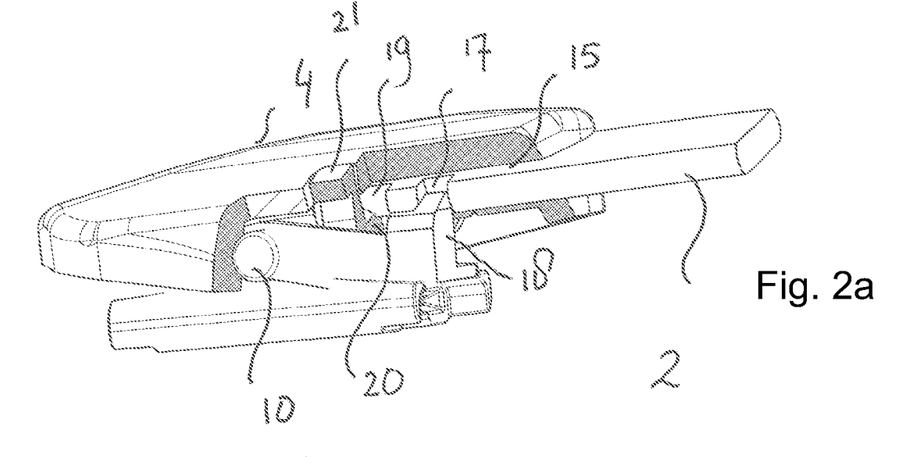
FIGS. 2a, 2b, and 2c show in perspective and partly in cross-section the windscreen wiper arm and the connector of FIG. 1 in assembled position.
Figure 2B:
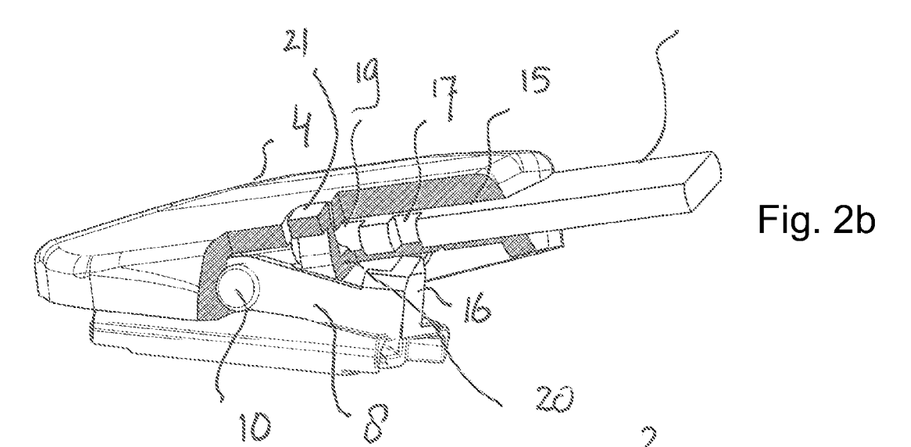
Figure 2C:
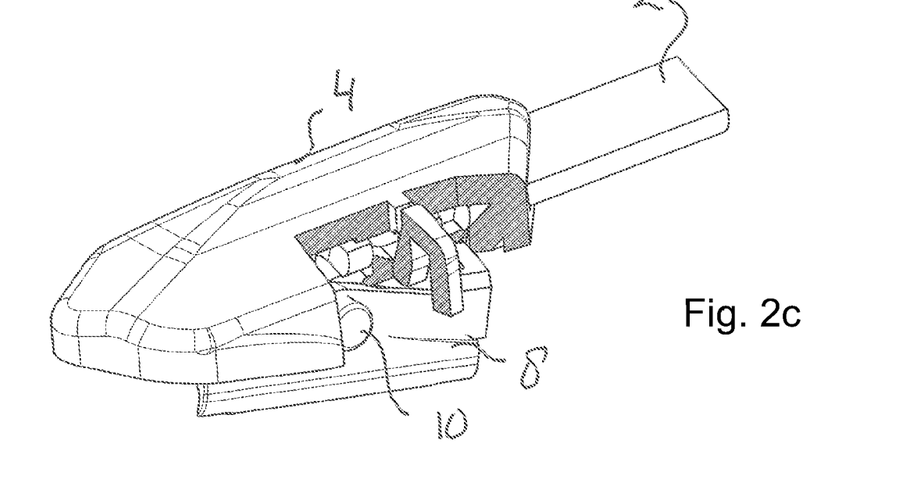
Figure 3A:
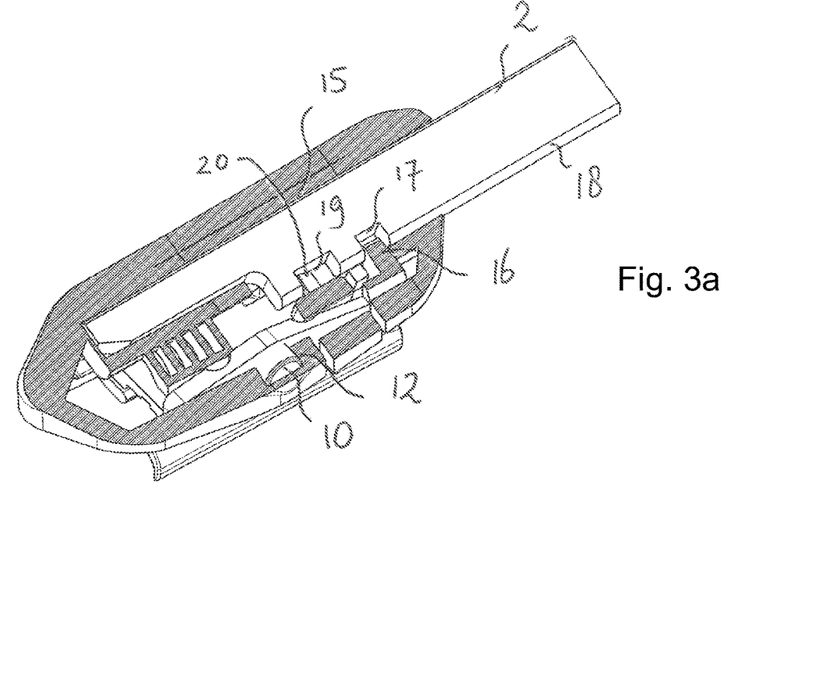
FIGS. 3a and 3b show details of FIG. 2 in an upper view partially in cross-section and partially cut open.
Figure 3B:
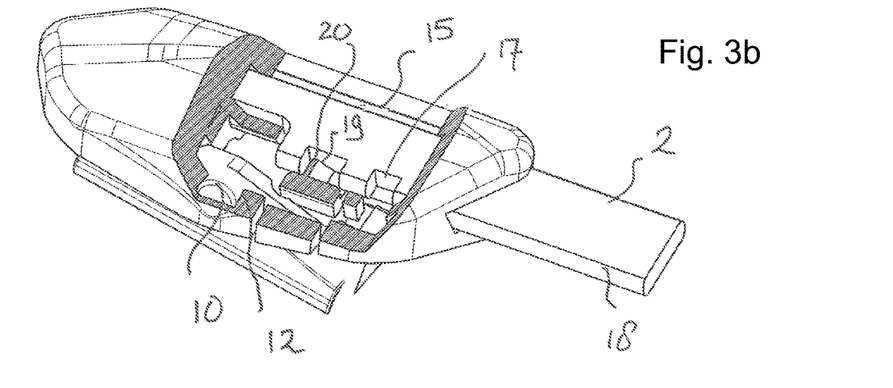
Figure 4A:
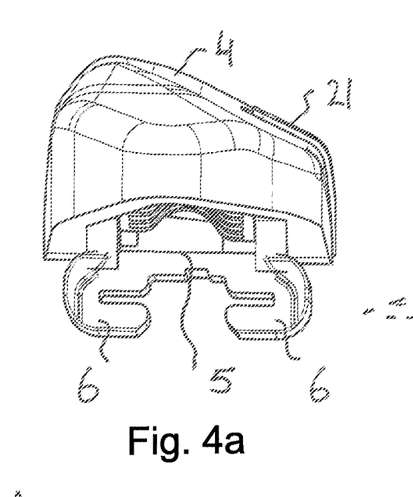
FIG. 4a shows details of FIG. 2 in a side view.
Figure 4B:
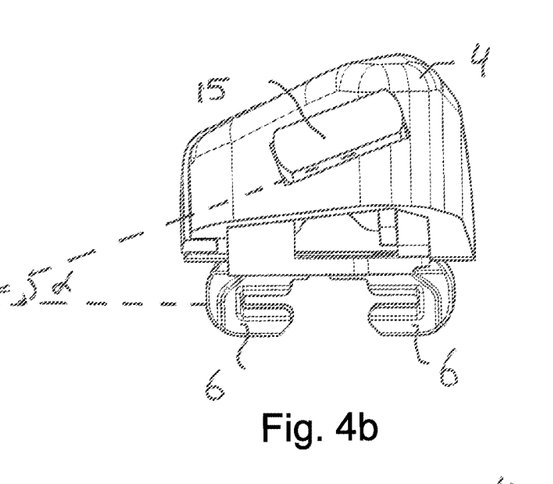
FIG. 4b shows details of FIG. 2 in a side view.
Figure 4C:
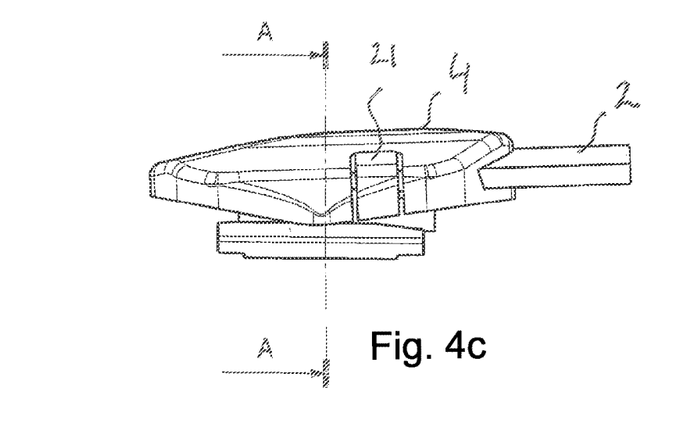
FIG. 4c shows details of FIG. 2 in a side view.
Figure 4D:
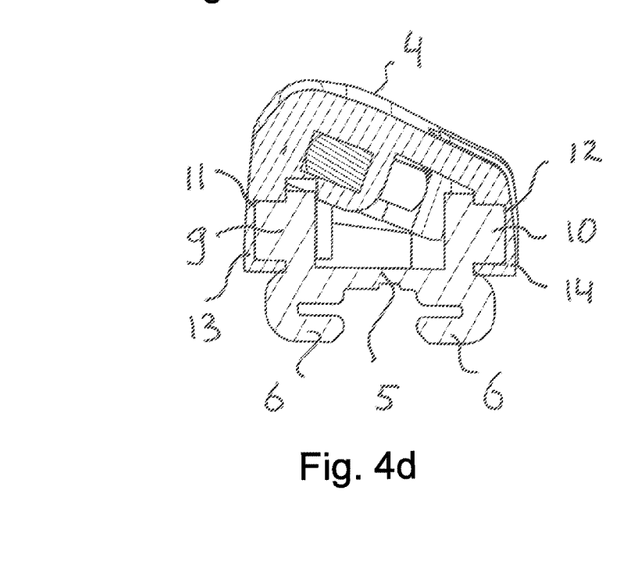
FIG. 4d shows details of FIG. 2 in a cross-sectional side view.

FIG. 1 refers a windscreen wiper device of the flat blade type built up of a wiper blade, in the longitudinal sides of which opposing longitudinal groove are formed, and of longitudinal strips ("flexors") made of spring band steel, which are fitted in the longitudinal grooves. The strips form a flexible carrier element for the rubber wiper blade, as it were, which is thus biased in a curved position (the curvature in operative position being that of a windscreen to be wiped). As shown in FIGS. 1, 2, 3 and 4, the windscreen wiper device is furthermore built up of a connecting device 1 of plastic material for a rod-like extension 2 of a windscreen wiper arm. The connecting device 1 comprises a first part 3 and a second part 4 acting as a joint part. The rod-like extension 2 arm can be pivotally connected to the first part 3 about the pivot axis, with the interposition of the second part 4. The first part 3 comprises a flat base 5 having inwardly extending legs 6 integral therewith engaging around longitudinal sides of the wiper blade, at the location of the grooves, as a result of which the first part 1 is firmly attached to the unit consisting of the wiper blade and the strips. The first part 3 comprises two opposite side walls 7,8 extending in upright direction from the flat base 5. On the opposite side walls 7,8 are formed cylindrical protuberances 9,10 extending outwardly. These protuberances 9,10 pivotally engage, at the location of the pivot axis, in identically shaped recesses 11,12 provided in opposite walls 13,14 of the second part 4. Hence, the second part 4 is detachably connected to the first part 3 through a snapping/clipping operation. As shown in FIG. 2 above, the side walls 7,8 of the first part 3 are entirely located inside the second part 4 in a working position of the wiper blade.

With reference to FIGS. 1 through 6 the second part 4 comprises a channel 15 arranged to receive (in a linear movement) the rod-like extension 2 of the oscillating arm. As shown, the channel 15 has a length and a width. A plane extending in a direction of the width of the channel and a plane extending through the longitudinal strip along a width thereof at the location of the connecting device enclose an angle α=300.

One of the side walls 8 of the first part 3 comprises a protrusion 16 extending sidewards and inwards and arranged to engage into a first recess 17 having an open circumference and provided on a longitudinal exterior side 18 of the rod-like extension 19. For mounting or dismounting the connecting device 1 from the rod-like extension the second part 4 (and thus the free end of the rod-like extension 2 connected thereto), is pivoted relative to the first part 3, wherein reference is made to FIGS. 1, 2 middle and bottom. As far as dismounting is concerned, while carrying out the pivot movement, the protrusion or cam 16 is no longer in line with the first recess 17, so that the second part 4 and the first part 3 attached thereto can be released from the rod-like extension 2 (see service position seen in FIG. 2 middle and bottom). As far as mounting is concerned, while carrying out the pivot movement, the protrusion or cam 16 becomes in line with the first recess 17, so that the second part 4 and the first part 3 attached thereto is retained onto the rod-like extension 2 (working position seen in FIG. 2a). The mutually cooperating protrusion 16 and recess 17 act as second retention means in case first retention means, as explained below, would inadvertently fail.

The rod-like extension 2 is also provided with a second recess 19 also having an open circumference and also provided on the same longitudinal exterior side 18 of the rod-like extension 2. As shown, the first and second recesses 17,19 have an open circumference and are spaced-apart in longitudinal direction. The second recess 19 cooperates with a resilient tongue 20 on the second part 4 arranged to engage into a second recess 19, together acting as first retention means in this case. The resilient tongue 20 is hingeable along a hinge axis between an inward position retaining the second part 4 (together with the first part 3 and the wiper blade attached thereon) onto the rod-like extension 2 and an outward position releasing second part 4 (together with the first part 3 and the wiper blade attached thereon) from the rod-like extension 2. The resilient tongue is hingeable (i.e. activated and deactivated) from the inward position into the outward position by a push button 21. The push button 21 forms a part of an outer wall 22 of the second part 4 and is located near a free end of the second part 4 facing towards the rod-like extension 2.

Figure 5A:
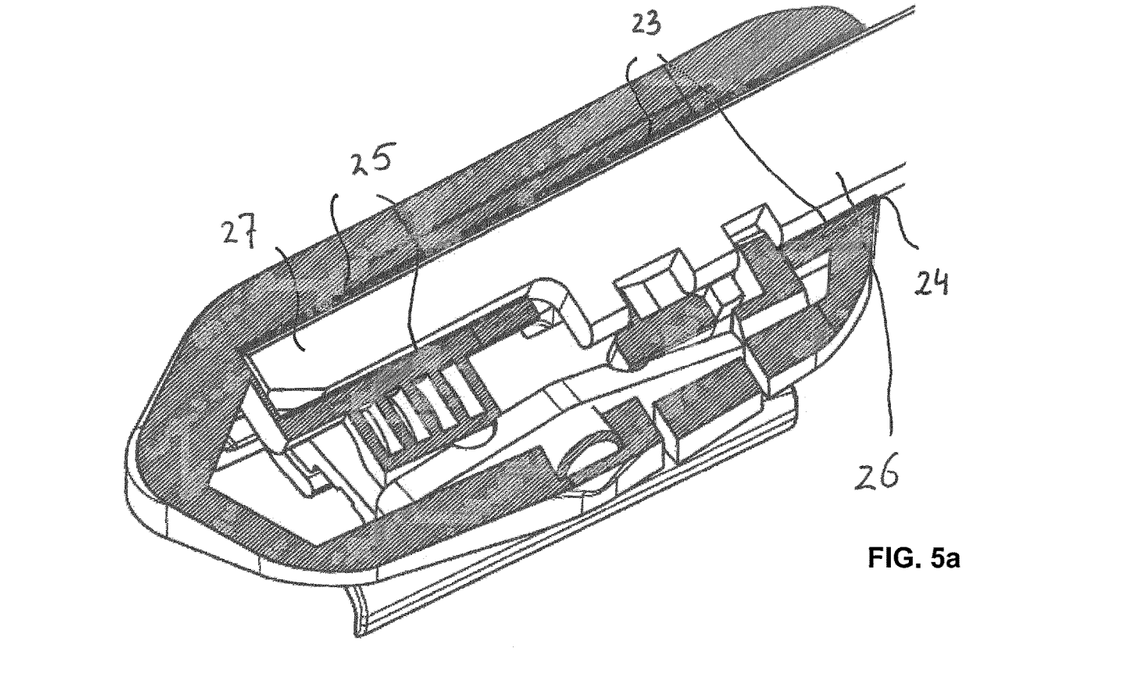
FIG. 5a shows a top view of FIG. 3.

As depicted in FIG. 5a, the channel 15 comprises a first chamber 23 facing towards an entrance 24 of the channel 15, as well as a second chamber 25 facing away from the entrance 24. The first chamber 23 is wider than the second chamber 25. The first chamber 23 is arranged to receive a first part 26 of a free end of the rod-like extension 2. The second chamber 25 is arranged to receive a second part 27 of the free end of the rod-like extension 2.

The free end of the rod-like extension 2 has a cut-out 28 in order to form the two parts 26,27 therein. The first part 26 is wider than the second part 27. As indicated, the second part 27 forms a longitudinally extending finger, as if it were, to be accommodated in the correspondingly shaped second chamber 25 of the channel 15. The wider first part 26 is to be accommodated in the correspondingly shaped first chamber 23 of the channel 15. The first part 26 of the rod-like extension 2 comprises the recesses 17,19 cooperating with the protrusion 16 and the resilient tongue 20 of the connecting device 1.

Figure 5B:
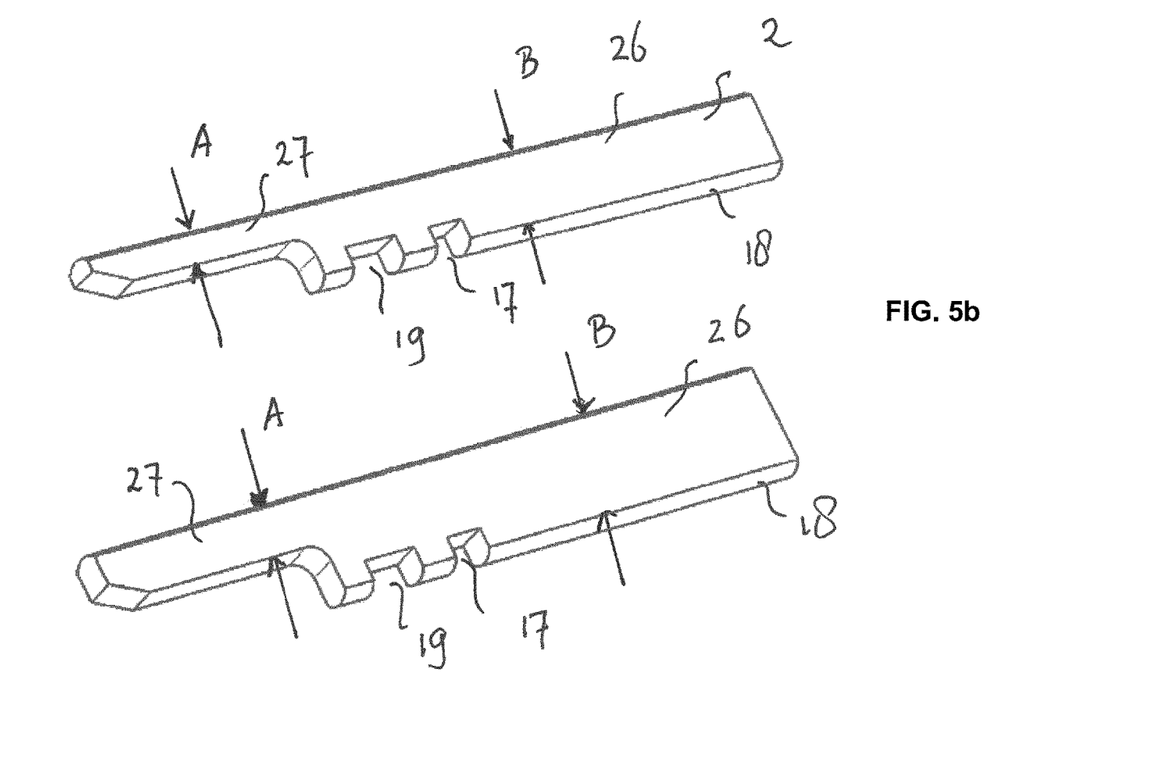
FIG. 5b shows in perspective two types of rod-like extensions to be accommodated inside the connecting device.
Figure 6A:
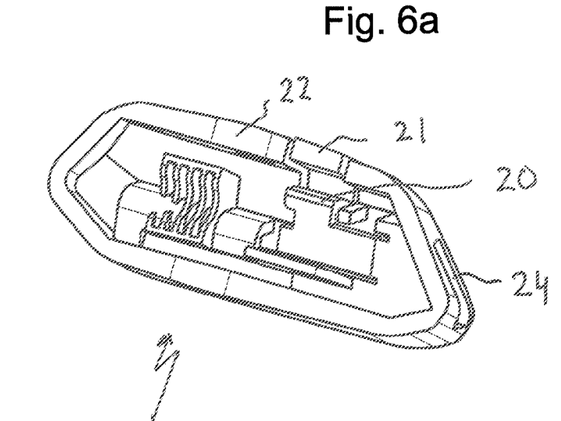
FIGS. 6a, 6b, 6c, and 6d show various bottom views of the connecting device of FIG. 1.
Figure 6B:
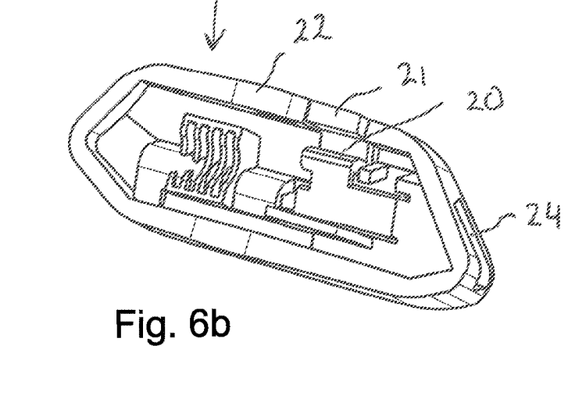
Figure 6C:
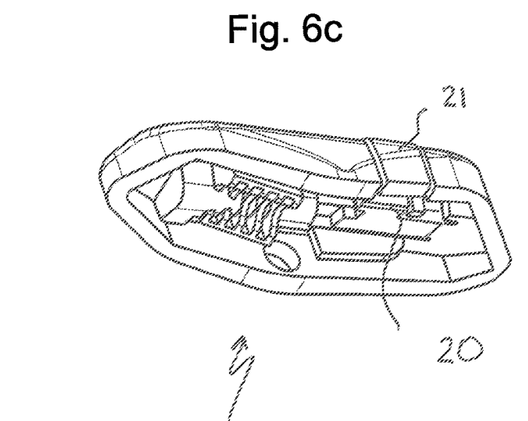
Figure 6D:
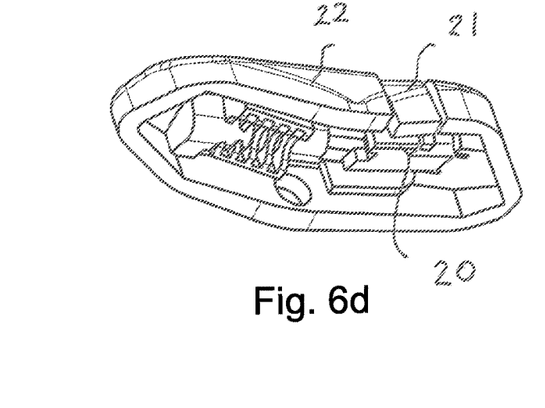

As seen in FIG. 5b, there two types of rod-like extension 2 to be accommodated in the chambers 23,25 of the channel 15: these types mutually differ in width A,B of the first and second parts 26,27 thereof.

FIG. 6 shows various bottom views of the second part 4 of the connecting device of FIG. 1 clearly showing how the resilient tongue 20 can be activated or deactivated with the help of the push button 21. By pushing in the push button 21 the resilient tongue 20 is removed from the recess 19, so that the wiper blade 2 may be released from the rod-like extension 2.

The invention is not restricted to the preferred embodiments shown in the figures, but extends also to other preferred variants within the scope of the appended claims.

The invention claimed is:

1. A windscreen wiper device of the flat blade type comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for a rod-like extension of an oscillating arm, wherein said rod-like extension can be pivotally connected to said connecting device about a pivot axis near a free end thereof, wherein said connecting device comprises a channel arranged to receive said rod-like extension, said channel including a first chamber facing towards an entrance of said channel, and a second chamber facing away from said entrance, said first chamber having a larger width than said second chamber, wherein said first chamber is arranged to receive a first part of said free end of said rod-like extension, wherein said second chamber is arranged to receive a second part of said free end of said rod-like extension, said first part of said rod-like extension having a larger width than said second part of said rod-like extension, and wherein, when said rod-like extension is received in said channel, said first part of said free end having the larger width is situated in the first chamber directly adjacent to said entrance and said second part of said free end having a smaller width is situated away from said entrance of said channel.

2. A windscreen wiper device according to claim 1, wherein said channel is arranged to receive two types of said rod-like extension, said types mutually differing in width of said first and second parts thereof.

3. A windscreen wiper device according to claim 1, wherein said connecting device comprises a sidewardly and inwardly extending protrusion arranged to engage into a first recess provided on a longitudinal exterior side of said rod-like extension, wherein said connecting device comprises a resilient tongue arranged to engage into a second recess provided on said longitudinal exterior side of said rod-like extension, and wherein said resilient tongue is hingeable along a hinge axis between an inward position retaining said wiper blade onto said rod-like extension and an outward position releasing said wiper blade from said rod-like extension.

4. A windscreen wiper device according to claim 3, wherein said protrusion engages into said first recess retaining said wiper blade onto said rod-like extension when said wiper blade is in a working position; and wherein said protrusion disengages from said first recess releasing said wiper blade from said rod-like extension when said wiper blade is in a service position.

5. A windscreen wiper device according to claim 3, wherein said first and second recesses have an open circumference and are spaced-apart in a longitudinal direction.

6. A windscreen wiper device according to claim 3, wherein said resilient tongue is hingeable from said inward position into said outward position by a push button, wherein said push button forms a part of an outer wall of said connecting device.

7. A windscreen wiper device according to claim 6, wherein said push button is located near a free end of said connecting device facing towards said rod-like extension.

8. A windscreen wiper device according to claim 3, wherein said channel has a length and a width, and wherein a plane extending in a direction of the width of said channel and a plane extending through said longitudinal strip along a width thereof at the location of the connecting device enclose an angle.

9. A windscreen wiper device according to claim 8, wherein said angle is between 15 and 60 degrees.

10. A windscreen wiper device according to claim 3, wherein said connecting device comprises a first part and a second part, wherein said rod-like extension of said oscillating arm can be pivotally connected to said first part about said pivot axis, with the interposition of said second part, wherein said second part comprises said channel, and wherein said first part is connected to said wiper blade and said second part is detachably connected to said first part.

11. A windscreen wiper device according to claim 10, wherein said first part and said second part are provided with mutually cooperating pivot means for pivotally connecting said second part to said first part.

12. A windscreen wiper device according to claim 11, wherein said second part is connected to said first part by pivotally engaging protuberances of said first part, at the location of said pivot axis, in recesses provided in said second part.

13. A windscreen wiper device according to claim 10, wherein said second part is detachably connected to said first part through a snapping/clipping operation.

14. A windscreen wiper device according to claim 10, wherein said first part comprises a flat base having legs integral therewith engaging around longitudinal sides of the wiper blade, at the location of said groove.

15. A windscreen wiper device according to claim 14, wherein said first part comprises two opposite side walls extending in an upright direction from said base, and wherein one of said side walls comprises said sidewardly and inwardly extending protrusion.

16. A windscreen wiper device according to claim 15, wherein said pivotally engaging protuberances of said first part are provided outwardly on said opposite side walls, and wherein said recesses are provided inwardly in opposite walls of said second part.

17. A windscreen wiper device according to claim 15, wherein said side walls of said first part are entirely located inside said second part in a working position of said wiper blade.

18. A windscreen wiper device according to claim 10, wherein said first and said second parts are each made in one piece of plastic material.

19. A connecting device arranged for use in such a windscreen wiper device according to claim 1.

20. An oscillating arm with a rod-like extension arranged for use in such a windscreen wiper device according to claim 1.

* * * * *